United States Patent
Yasue

[11] Patent Number: 6,089,071
[45] Date of Patent: Jul. 18, 2000

[54] METHOD FOR CONTROLLING PRESS WORKING BY MEANS OF WORKING WHEELS

[75] Inventor: Satoru Yasue, Aichi, Japan

[73] Assignee: Nisshinbo Industries, Inc., Japan

[21] Appl. No.: 09/174,251

[22] Filed: Oct. 16, 1998

[30] Foreign Application Priority Data

Oct. 20, 1997 [JP] Japan ..................... 9-303354

[51] Int. Cl.$^7$ .................................................. B21B 23/00
[52] U.S. Cl. .............................. 72/365.2; 72/197; 72/207; 72/20.1
[58] Field of Search .............................. 72/179, 180, 182, 72/188, 192, 197, 207, 214, 220, 20.1, 20.2, 365.2; 83/76.1, 344, 345, 500, 503

[56] References Cited

U.S. PATENT DOCUMENTS

| | | | |
|---|---|---|---|
| 3,756,057 | 9/1973 | Brooks, Jr. et al. .................... | 72/207 |
| 5,231,860 | 8/1993 | Tsuruta et al. .......................... | 72/20.1 |
| 5,269,163 | 12/1993 | Yagi et al. .............................. | 72/20.1 |
| 5,555,759 | 9/1996 | Rosene et al. .......................... | 72/179 |
| 5,682,782 | 11/1997 | Rosene et al. .......................... | 72/179 |
| 5,787,775 | 8/1998 | Stevens et al. ......................... | 83/76.1 |
| 5,890,389 | 4/1999 | Ohba et al. ............................. | 72/252.5 |

*Primary Examiner*—Ed Tolan
*Attorney, Agent, or Firm*—Rogers & Killeen

[57] ABSTRACT

A method for controlling press working by means of working wheels is disclosed which is capable of solving problems in conventional punch press working by means of working wheels. The method comprises: in punch press working by means of working wheels, moving at least an upper working wheel relative to a work in Z axis direction in an arbitrarily set amount assigned to the movement at the beginning or end of the working along an intended working line.

9 Claims, 7 Drawing Sheets

6,089,071

METHOD FOR CONTROLLING PRESS WORKING BY MEANS OF WORKING WHEELS

BACKGROUND OF THE INVENTION

1. Field of the Invention

The present invention relates to a method for controlling press working which comprises placing a work between upper and lower working wheels each rotatably supported by a horizontal shaft, and effecting relative movement between the work and the upper and lower working wheels to carry out working of a work, such as cutting, cutting a piece out, or drawing.

2. Description of the Prior Art

A method for working by means of a punching press machine using working wheels has previously been proposed in a Japanese Patent Application by the Applicant of the Present Application. Still, the method has been found to have problems to be solved.

Specifically, as schematically illustrated in FIG. 1, the punching press machine using working wheels comprises upper and lower working wheels 1, 6 including circular blades 2, 7 and circular stopper 3, 8 smaller in diameter than the circular blades 2, 7, respectively. The blade 2 and the stopper 3 are mounted on a common horizontal shaft 4 in contact with each other, and the blade 7 and the stopper 8 are mounted on a common horizontal shaft 9 in contact with each other. The upper and lower working wheels 1, 6 are vertically arranged in a cooperative manner, and a work W in the form of a plate is held therebetween. The working wheels 1, 6 and the work W are relatively moved in a direction which permits rotations of the working wheels, thereby effecting working of the work W such as cutting. Accordingly, the previously proposed punching press machine is capable of effectively carrying out working of a work such as cutting and cutting a piece out as compared with, for example, nibbling by means of a conventional punching press machine. On the other hand, however, the previously proposed punching press machine has been found to have the following problem due to the circular shape of the blade in its side view.

The problem is as follows. As schematically shown in FIG. 2, at an end Ce of a cutting line in cutting of a work W, boundary edges of a cut work Wc and the parent work W are still in engagement with the blades 2, 7 (shown in FIG. 2 by chain-dotted lines) of the working wheels 1, 6. Accordingly, if the parent work W in this condition is moved in a direction different from that of the cutting line, undesirable engagement between the work W and the blades 2, 7 of the working wheels 1, 6 is likely to be caused, leading to damage to the work W and the blades. This can be avoided by dissociating the working wheels 1, 6 from the surfaces of the work W, as shown in FIG. 2 by solid lines. However, if such dissociation of the working wheels 1, 6 from the surfaces of the work W is effected at the end Ce of the cutting line in parallel with the movement of the work W for the cutting, the working wheels 1, 6 cut the work W beyond the otherwise end Ce of the cutting line. This results in excess cutting to give rise to another problem.

Further, as well-known, it is considerably difficult in practice to cut a work along an arcuate cutting line having a small radius with blades (linear blades) having a certain length.

Moreover, in drawing by means of working wheels, the resultant therefrom has a shape which delicately varies between the starting point of the working at the beginning of the drawing and the endpoint of the working at the end of the drawing. Accordingly, if the drawing is carried out along a closed drawing course, the terminal of the drawing course at which the starting point and the endpoint of the drawing meet together is likely to be unsmooth in shape.

In addition, in deep drawing by means of working wheels, an amount of total draw depth of the deep drawing applied to a work by a ram (upper working wheel) is large. Accordingly, if the deep drawing is performed to the draw depth at one stroke, a clamp holding a work is likely to come off for protecting the equipment from overloading. Under the existing circumstances, to avoid this, a program is prepared according to which the same working (drawing) steps are repeated with a small amount of draw depth in each working step applied by the ram, thereby carrying out deep drawing. However, if deep drawing is carried out in this manner, programs of the same contents must be written over a plurality of working steps. Further, a tact time of the working is unavoidably long.

SUMMARY OF THE INVENTION

It is an object of the present invention to provide a method for controlling press working which is capable of solving the above-described problems in punch press working by means of working wheels.

The present invention has been made with a view to attaining the above object. According to the primary aspect of the present invention, there is provided a method for controlling press working by means of working wheels, the method comprising:

in punch press working by means of working wheels; moving at least an upper working wheel relative to a work in Z axis direction in an arbitrarily set amount assigned to the movement at the beginning or end of the working along an intended working line.

According to another aspect of the present invention, there is provided a method for controlling press working by means of working wheels, the method comprises:

moving at least an upper working wheel in Z axis direction in an appropriate amount of stroke which can arbitrarily be set while subjecting a work and working wheels to relative movement in X or Y axis direction to perform working.

According to still another aspect of the present invention, there is provided a method for controlling press working by means of working wheels, the method comprises:

in drawing by relative movement between a work and working wheels in X or Y axis direction; moving at least an upper working wheel also in Z axis direction at the beginning or end of the drawing, to thereby substantially eliminate difference in cross-sectional shape of the drawing between the beginning and the end of the drawing in a case of drawing along a linear course, and to thereby ensure continuity in cross-sectional shape at both ends of the drawing in a case of drawing along a closed course.

According to a further aspect of the present invention, there is provided a method for controlling press working by means of working wheels, the method comprises:

preliminarily setting an amount of draw depth with respect to a ram in one drawing on the basis of data on tools (working wheels) such as a type the tools (for example, whether the tools are of a rib type or of an offset type.), and radii of the tools; a number of clamps to be used; a material and a thickness of a work W; (in a case of R-drawing) curvature; working speed; and working accuracy; and the like; and subjecting the pre-set amount of draw depth and a total amount of draw depth necessary to reach the bottom dead center of the ram specified in a program for intended drawing to comparison operation, and performing the drawing with the pre-set amount of drawing depth once or a plurality of times.

BRIEF DESCRIPTION OF THE DRAWINGS

FIGS. 8(a) to 8(f) are diagrammatic views showing examples of a manner of movement of an upper working wheel relative to a work in the method of the present invention, wherein FIG. 8(a) shows movement of a sine wave type, FIG. 8(b) a triangular wave type, FIG. 8(c) a serration-shaped wave type, FIG. 8(d) another serration-shaped type, FIG. 8(e) a rectangular wave type, and FIG. 8(i) a trapezoidal wave type.

DESCRIPTION OF THE PREFERRED EMBODIMENTS

In the following, embodiments of the present invention will be described with reference to the drawings.

Figure 1:
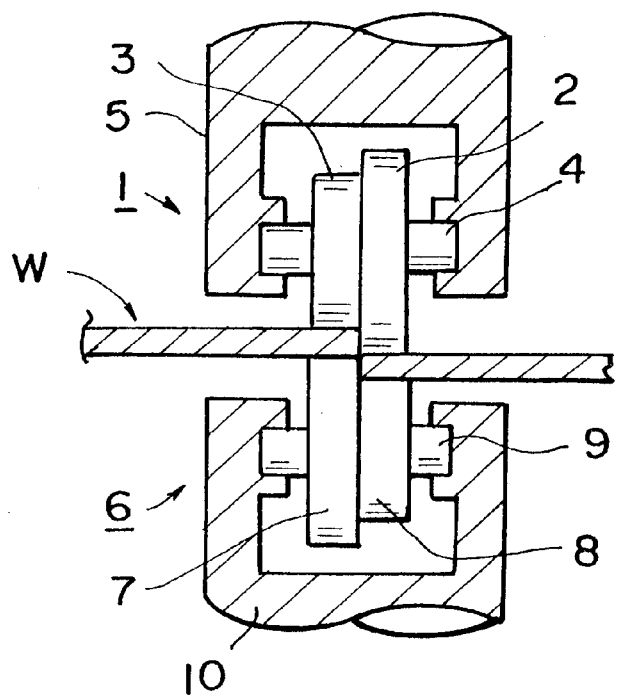
FIG. 1 is a sectional front view illustrating cutting of a work in the form of a plate by means of working wheels, to which the present invention is applied.

In FIG. 1, reference number 1 represents an upper tool in the form of a working wheel, and the upper working wheel 1 comprises a circular blade 2 and a circular stopper 3 having a diameter smaller than that of the blade 2. The blade 2 and the stopper 3 are mounted on a common shaft 4 in contact with each other. The upper working wheel 1 mounted on the shaft 4 common to the blade 2 and the stopper 3 is rotatably supported by an upper working wheel casing 5 with peripheral edges of the blade and the stopper slightly protruded from the bottom of the upper working wheel casing 5.

Reference number 6 represents a lower working wheel (a lower tool) which makes a pair with the upper working wheel 1, the lower working wheel 6 comprises a blade 7 and a stopper 8 as counterparts of the blade 2 and the stopper 3 of the upper working wheel 1. The blade 7 and the stopper 8 are mounted on a common shaft 9. The lower working wheel 6 mounted on the shaft 9 is rotatably supported by a lower working wheel casing 10 with peripheral edges of the blade and the stopper slightly protruded from the top of the lower working wheel casing 10.

A work W in the form of a plate which is to be worked by the upper and lower working wheels 1, 6 is placed between the blade and stopper 2, 3 of the upper working wheel 1 and the blade and stopper 7, 8 of the lower working wheel 6, and then the work W is moved relatively to the working wheels 1, 6 in such a direction that the blades and stoppers are permitted to rotate under condition as shown in FIG. 1. Thereby, cutting or drawing of the work W is carried out.

A thickness of a work W which can be worked is in the range smaller than the difference in radius between the blades 2, 7 and the stoppers 3, 8 of the upper and lower working wheels. With respect to each working wheel, a portion thereof which is operative to perform working may have various cross-sectional shapes according to the purposes of working although an operative portion of the example the working wheel in FIG. 1 has a cross-sectional shape of rectangular steps. In particular, working wheels for drawing may have various cross-sectional shapes in operative portions thereof, for example, an arc-like cross-sectional shape (not shown), and slope-like cross-sectional shape (not shown).

The upper and lower working wheels 1, 6 are supported by an upper tool holder (not shown) or a ram (not shown) including the holder which is vertically movable and a lower tool holder (not shown) which is vertically unmovable, respectively, as in a case of tools of a known punching press machine including a turret punching press machine. The upper tool holder can be kept at any vertical position (on Z axis) by a punch head (not shown) which is vertically movable by an actuator such as a cylinder. When the upper tool holder is pushed down toward the lower working wheel 6 and kept at a bottom dead center (determined taking the thickness of the work W into account) by the punch head, the work W is relatively moved in the direction which permits the blades and stoppers of the working wheels 1, 6 to rotate to thereby plastically deform the work W.

Figure 2:
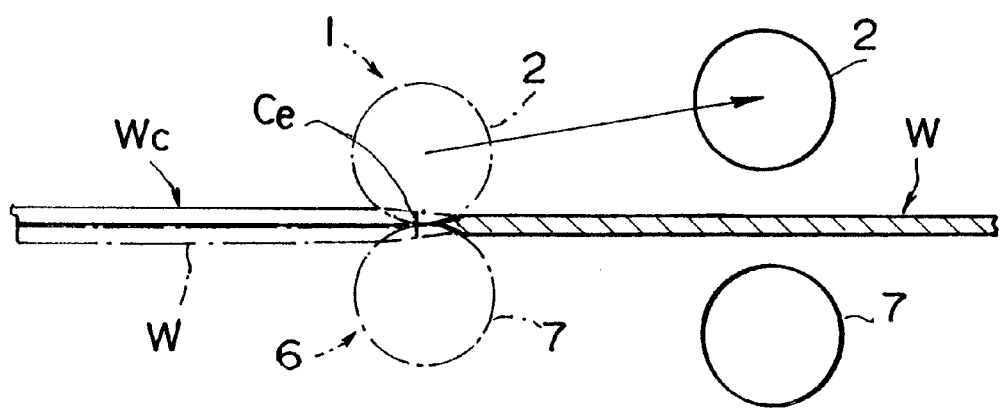
FIG. 2 is a side view illustrating cutting of a work in the form of a plate by means of working wheels.

In punch press working by means of upper and lower tools 1, 6 of the above-described working wheel type, when state of cutting in FIG. 1 is viewed sidewise, edges of blades 2, 7 of the upper and lower working wheels 1, 6 are partly in engagement with a parent work W and a cut work Wc, as shown in FIG. 2 by chain-dotted lines. Accordingly, without taking any measures under such a condition, the work W cannot be moved in any other direction than the direction of the cutting line.

To avoid this, in conventional techniques, the upper working wheel 1 is raised in the direction of the prolongation line (shown by a solid line in FIG. 2) of the cutting line by elevation of a ram as intermediary operation and thereby drawn from the cut groove. However, because the upper working wheel 1 is raised by the intermediary operation of the ram, an uncut portion of the parent work W is additionally cut at an initial stage of the raising of the upper working wheel 1. This results in excessive cutting of the parent work W beyond an intended length.

Figure 6:
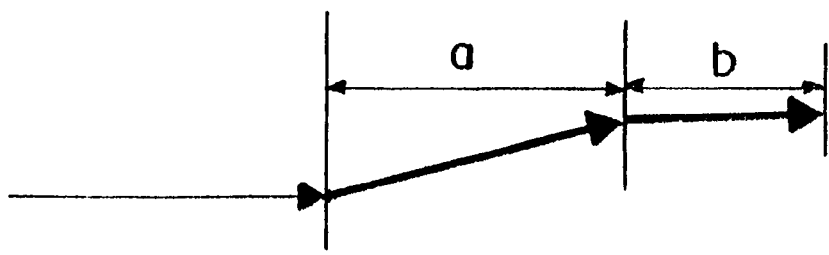
FIG. 6 is a side view diagrammatically showing an example of a manner of movement of an upper working wheel in the method of the present invention.
Figure 7:
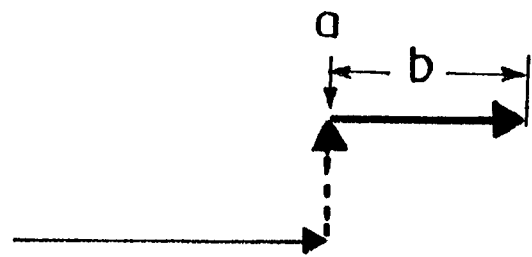
FIG. 7 is a side view similar to FIG. 6
Figure 8:
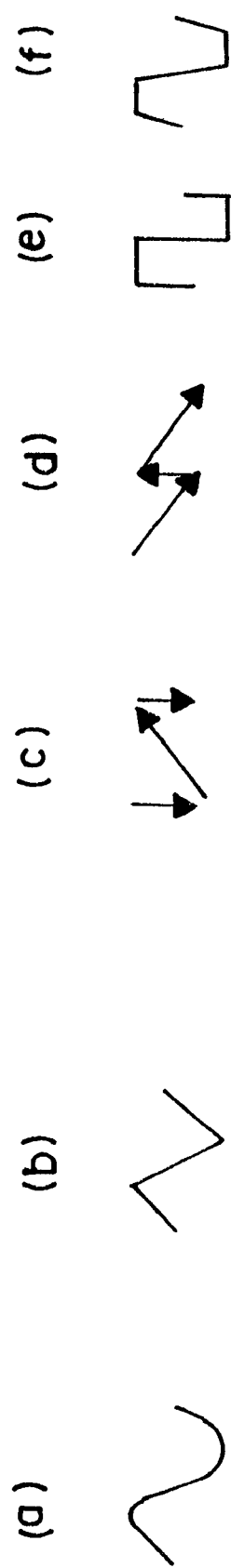

To solve the above problem, in the present invention, a program for escaping motion of the upper working wheel 1 at the end of cutting line is such that a horizontal escape distance along X or Y axis and a vertical escape distance along Z axis are independently set to specify relative movement between the work W and the upper working wheel 1 in (a) section, and subsequent to the (a) section, only an escape distance along X or Y axis is set and an escape distance along Z axis is not set to specify relative movement between the work W and the upper working wheel 1 in (b) section, as illustrated in FIG. 6. Accordingly, as illustrated in FIG. 7 by way of an example, in cutting whose terminal is within the whole length of the work W, the escape distance along X or Y axis is set to be 0 and the escape distance along Z axis is set to be a predetermined amount as the (a) section, and only the escape distance along X or Y axis is set to be a predetermined amount as the (b) section. In other words, the working wheel 1 is vertically raised at the end of cutting course and then horizontally moved in the predetermined amount as the (b) section. In this connection, as the predetermined amount of the movement along Z, there may be employed a stroke amount to a top dead center which is preliminarily set with respect to the ram of the upper working wheel 1.

As described above, according to the present invention, a short distance or 0 (null distance) may be assigned to the (a) section at the end of the cutting course, and a sufficient distance to the (b) section. By virtue of this, excess cutting is minimized, and escaping motion is realized which is capable of attaining smooth disengagement of the working wheel from the work.

Figure 3:
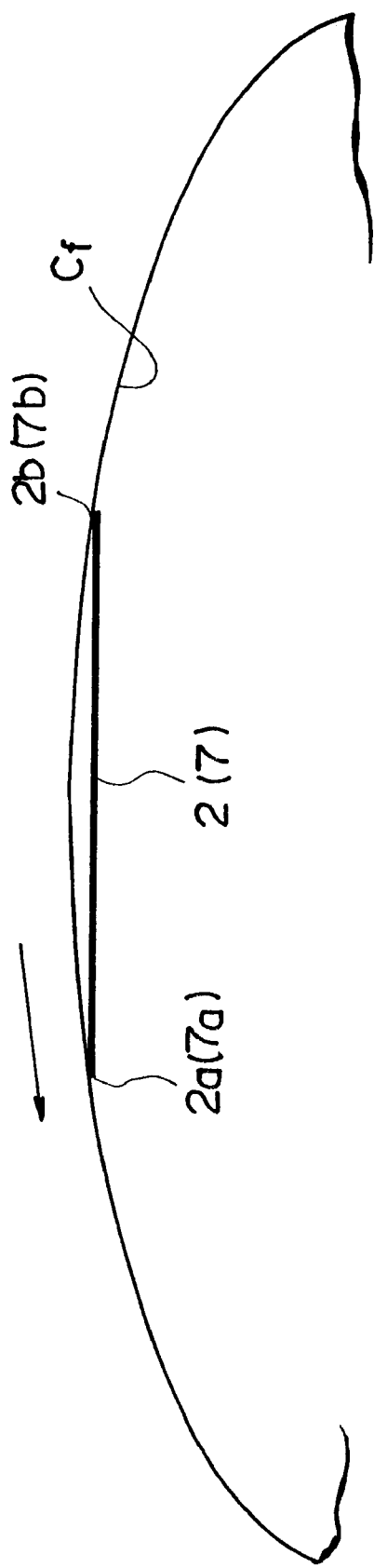
FIG. 3 is a plan view schematically showing cutting along an arcuate cutting line having a small radius by means of working wheels.

In the following, cutting along an arcuate cutting course will be described. When cutting is carried out using upper and lower tools 1, 6 of the working wheel type along an arcuate cutting course as illustrated in FIG. 3, a parent work W is cut by leading portions 2a, 7a (leading portions with respect to relative movement in the cutting of the work W) of edges of blades 2, 7 of the working wheels 1, 6. At the same time, rear portions 2b, 7b of the edges of the blades 2, 7 abut or scratch on the resulting cut surface Cf of the work W. Accordingly, in particular, if the arcuate cutting course in the cutting has a small radius of curvature, there is a problem that the cut surface Cf is roughened.

The present inventor has made intensive and extensive researches and performed various experiments with a view to solving the above problem. As a result, he has found that in cutting along an arcuate cutting line having a small radius of curvature, roughening of a cut surface Cf as described above can be prevented or reduced by moving an upper working wheel 1 in a short stroke during the cutting in such a manner that relative movement is attained between the upper working wheel 1 and a work W in relation to axis of advance (X or Y axis) and Z axis as illustrated in FIGS. 8(a) to 8(f), as well as making use, of course, of working wheels having a diameter small enough taking particulars of the work W into consideration. The present invention has been completed on the basis of the finding. To obtain the behavior, as illustrated in FIGS. 8(a) to 8(f), of the upper working tool 1 relative to the work at the cutting site of the work W, rate of movement of the work W is permitted to be freely set. In carrying out this method, for example, data on a radius of working wheels to be used and a radius of an arcuate cutting line may preliminarily be recorded in a database for numerical control (NC). Based on this, when the arcuate cutting line is recognized to require the behavior (relative movement) as illustrated in FIGS. 8(a) to 8(f), appropriate one of the behavior patterns is automatically selected.

In the following, description will be given on drawing by means of working wheels. When a work is subjected to conventional drawing for forming a convex or concave rib by means of upper and lower working wheels 1, 6, the rib shows delicate difference in its shape between the beginning of the drawing and the end of drawing, as previously described. The reason for this is as follows. In the beginning of the drawing, the drawing is effected in the advance direction of the working wheels relative to the work W and, at the same time, with respect to the right and left sides of the working wheels traveling in the advance direction. This results in a shallow draw depth, and thus the drawing is likely to be insufficient. Thereafter, however, the drawing is substantially uniform in a good state until its terminal. Accordingly, the resultant from the drawing in the form of a rib formed in the work is unlikely to have the same shape at its both ends.

Figure 4:
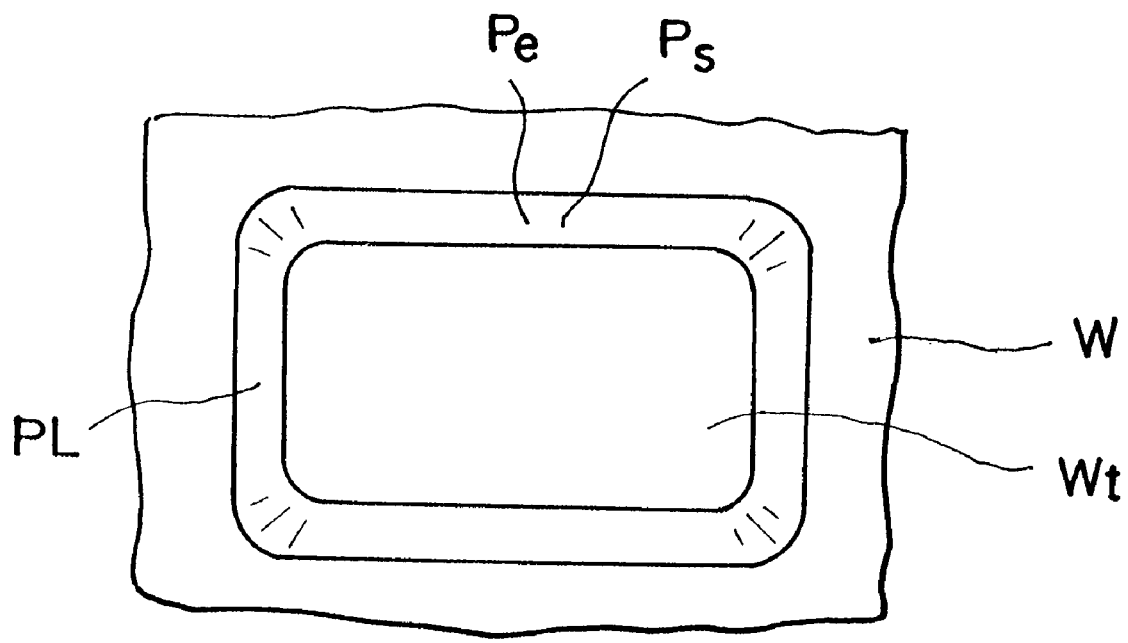
FIG. 4 is a plan view of a work subjected to drawing by means of working wheels different from those of FIG. 1 in wheel edge shape.
Figure 5:
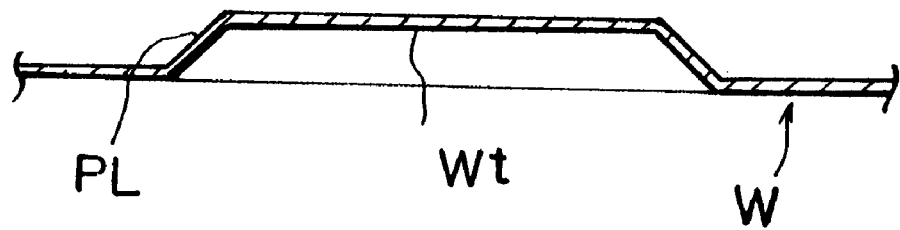
FIG. 5 is a sectional front view of the work in FIG. 4.

Such drawback is likely to occur also in a case where a work is subjected to drawing to form a plateau-like convexity W1 or an inverted plateau-like concavity (not shown) which has a trapezoidal section as illustrated in FIGS. 4 and 5. Specifically, when a work W is subjected to working (drawing) along closed working course PL by upper and lower working wheels 1, 6 whose surfaces to be pressed against the work W are provided with offset inclinations (not shown), the starting point Ps and the endpoint Pe of the working overlap each other at the same position in the work W. However, the drawing is insufficient at the starting point Ps of the working as described above, and thus depth of the drawing at the starting point Ps is different from that at the endpoint Pe of the working. This causes unsmoothness of the drawing line PL at the point.

Figure 9:
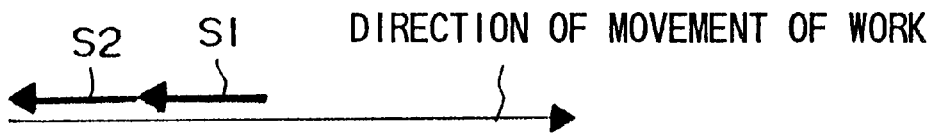
FIG. 9 is a plan view diagrammatically illustrating a manner of movement of an upper working wheel relative to a work in drawing.
Figure 10:
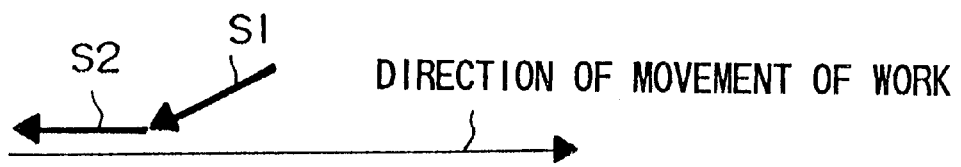
FIG. 10 is a side view of the manner of movement of the upper working wheel in FIG. 9.

To solve the problem, in the present invention, the upper working wheel 1 is so moved as to obtain substantially the same relative movement of the upper working wheel 1 with respect to the work W at the endpoint of the working course as that described with reference to FIGS. 6 and 7. Description will be given thereon with reference to FIGS. 9 and 10. FIG. 9 shows, in plan, a pattern of the relative movement of an upper working wheel 1 with respect to the work in the direction of X or Y axis (in X-Y plane) in drawing. FIG. 10 shows a side view of the pattern of the relative movement of the upper working wheel 1 in X-Z (or Y-Z) plane. As seen from FIG. 10, in the first step S1 of the beginning of the drawing, the upper working wheel 1 is moved to the bottom dead center for the drawing while moving the work W, and in the second step S2, the work W is moved while keeping the upper working wheel 1 at the bottom dead center which the upper working wheel 1 has reached in the first step S1. It is, thereby, possible to provide the work W with substantially the same depth of the drawing in the beginning of the drawing as that in the end of the drawing.

Figure 11:
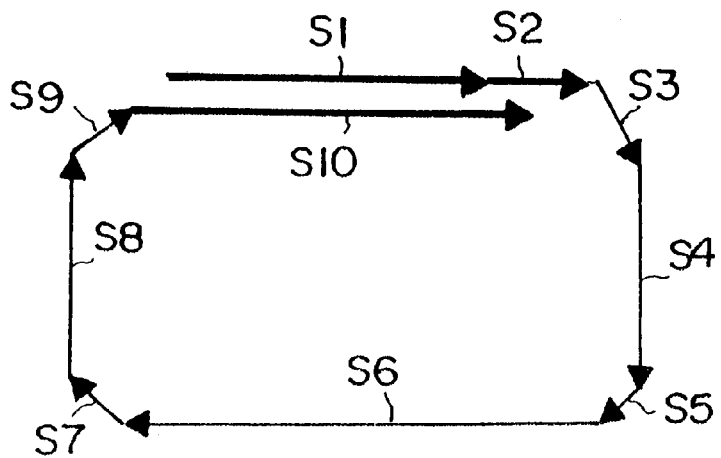
FIG. 11 is a plan view diagrammatically illustrating a manner of movement of an upper working wheel relative to a work in drawing by means of working wheels of an offset type in wheel edge shape.
Figure 12:
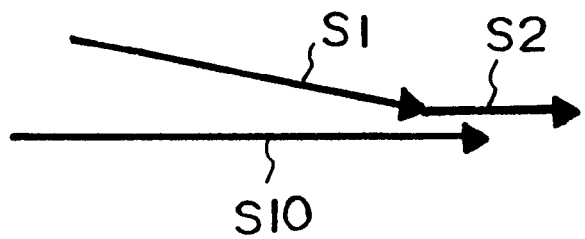
FIG. 12 is a side view of the manner of movement of the upper working wheel in FIG. 11.

FIGS. 11 and 12 shows a pattern of movement of the upper working wheel 1 relative to the work W to form the convexity Wt or concavity (not shown) in the work W as described with reference to FIGS. 4 and 5. FIG. 11 shows, in plan, the whole movement of the upper working wheel 1 relative to the work W in X-Y plane (plane along X and Y axes). FIG. 12 shows the relative movement of the upper working wheel 1 in the beginning and the end of the drawing in X-Z (or Y-Z) plane (plane along X and Z axes or Y and Z axes).

As seen from FIGS. 11 and 12, in the beginning the drawing, the upper working wheel 1 is relatively moved in the same manner as in the case with reference to FIGS. 9 and 10 in the first and second steps S1 and S2 to substantially prevent difference from being produced in draw depth between the beginning of the drawing and the other steps. In addition thereto, in the tenth step S10 as the final step of the drawing, the drawing is advanced to follow the drawing lines of the initial steps to such a position that the terminal of the relative movement of the upper working wheel 1 is in a midway of the drawing line of the second step S2. In other words, the drawing lines of the initial steps and the final step are overlapped. By virtue of this, even if there is difference in the state of the drawing to a certain extent between the beginning and the end of the drawing, the difference is absorbed by the re-drawing as a result of the overlapping movement.

When deep drawing, i. e., drawing which requires a large amount of total draw depth by a ram-actuated upper tool is carried out using tools of the working wheel type, a clamp holding a work can come off for protection of the equipment as previously described. To avoid this, a program has heretofore been prepared according to which an amount of draw depth in one drawing is set to correspond such a level of the bottom dead center of the ram that no clamp comes oft and the bottom dead center is lowered every drawing by the allowable amount of draw depth. In this method, the preparation of the program requires much time and labor. In addition, a small amount of draw depth in one drawing is preferred in order to obtain good working accuracy (fine finish). Accordingly, the same drawing operations with a small amount of draw depth are repeated a number of times. However, if the working (deep drawing) is performed in this manner, programs of the same contents must be prepared as many as the number of the drawing steps.

In the present invention, the following measures are taken with a view to solving the problem.

First, an applicable amount of draw depth in one drawing which can be set with respect to a ram is preliminarily set on the basis of factors, for example, data on the tools (working wheels) such as a type of upper and lower tools 1, 6 (for example, whether the tools are of a rib type or of an offset type. ), substantial stepwise difference corresponding to difference in radius between blades 2, 7 and stoppers 3, 8, and contour of the tools; a number of clamps used in working; a material and a thickness of a work W; (in a case where the drawing is carried out along an arcuate drawing line) a radius of the arcuate line; speed of the working; and intended fineness of finish. The amount of draw depth is recorded, for example, in a recorder for numerical control (NC).

Then, a position of the bottom dead center of the ram specified in a program and the above-described recorded amount of draw depth are subjected to comparison operation in the numerical control. If the result of the operation is such that the specified bottom dead center is reached in an amount of draw depth smaller than the recorded amount of drawing depth, drawing is performed with the amount of draw depth corresponding to the bottom dead center specified in the program. On the other hand, if the result of the operation is such that the specified bottom dead center is not reached in the recorded amount of draw depth in one drawing, drawing is performed with the recorded amount of draw depth as the maximum amount of drawing depth. Then, operation is conducted to know whether or not the rest of the distance to the bottom dead center is larger than the recorded amount of draw depth. If the rest of the distance to the bottom dead center is larger than the recorded amount of draw depth, drawing is performed with the recorded amount of draw depth. The same procedure is repeated until the current rest of the distance to the bottom dead center ultimately becomes smaller than the recorded amount of the draw depth. Finally, the amount of draw depth is changed to the ultimate rest of the distance to the intended bottom dead center, and drawing is performed with the changed amount of the draw depth to complete deep drawing.

Figure 13:
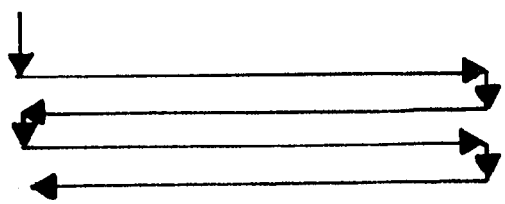
FIG. 13 is a side view diagrammatically showing an example of manner of movement of an upper working wheel relative to a work in deep drawing by means of working wheels.
Figure 14:
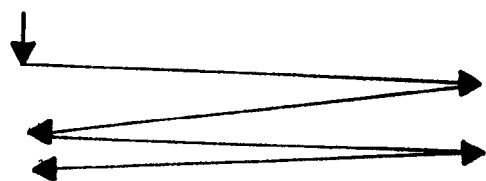
FIG. 14 is a side view similar to FIG. 13, which shows another example of the manner of movement of an upper working wheel relative to a work.

A manner of the movement of the upper tool (upper working wheel) 1 in the repeated drawing operations with the recorded amount of draw depth is as illustrated in FIG. 13 or FIG. 14. FIG. 13 shows such an example of the manner of the movement of the upper tool 1 relative to the work W that deepening operations are performed 4 times each with the recorded amount in Z1 to Z4. FIG. 14 shows such an example the manner of the movement of the upper tool 1 relative to the work W that the deepening operations, i. e., ram (upper tool) lowering operations corresponding to those in Z2 to Z4 of FIG. 13 are performed while the work W is being moved. By employing the operations of the ram in this manner, a shorter tact time of the working can be attained as compared with the case in FIG. 13. The manner of the relative movement of the upper tool 1 with respect to the work W for performing the working includes a type where working (drawing) operations are performed in advance and return motions, and a type (not shown) where on completion of one relative movement of the upper tool 1 from the starting point to the endpoint of working (drawing) operations, the ram is raised and the work W is returned to the original position so as to again relatively move the upper tool 1 for performing working from the starting point to the endpoint. In the latter type, the procedure is repeated. In this connection, FIGS. 13 and 14 are examples of the type where the upper tool 1 performs working operations in advance and return motions thereof relative to the work W.

The present invention is constructed as described above and has the following characteristic effects.

(1) In the method of the present invention which is applied to cutting of a work, a short distance or 0 (null distance) is assigned to the first section of the escaping motion at the end of a cutting line, and a sufficient distance is assigned to the second section of the escape motion. By virtue of this, excess cutting is minimized, and escaping motion is realized which is capable of attaining smooth disengagement of the working wheel from the work.

(2) In the present invention, when a work is subjected to cutting along an arcuate cutting line having a small radius of curvature, roughening of the resulting cut surface can be prevented or reduced by moving an upper working wheel in a short stroke during the cutting in such a manner that relative movement of the upper working wheel is attained in relation to axis of the advance (X or Y axis) and Z axis.

(3) In drawing in accordance with the method of the present invention, the upper working wheel is so moved as to obtain substantially the same relative movement of the upper working wheel with respect to the work as that at the endpoint of the cutting course. It is, thereby, possible to attain substantially the same drawing depth at the starting point of the drawing as that at the endpoint of the drawing.

(4) In deep drawing, such an applicable amount of drawing depth that a clamp does not come off is preliminarily set on the basis of working conditions, for example, data on tools such as a type of the tools, radii of the tools; and a material and a thickness of a work W. The deep drawing is carried out in such a manner that drawing operations each with the pre-set amount of drawing depth are repeated. By virtue of this, a shortened tact time of the working can be attained, and labor for program preparation can greatly be relieved.

What is claimed is:

1. A method for working a workpiece aligned in a plane, the working effected along a drawing course by a punch press machine having a ram and upper and lower working wheels, said method comprising the steps of:

(a) selecting a desired amount of drawing depth in the workpiece based on a set of parameters;
   (b) comparing the selected drawing depth to a bottom depth necessary to reach bottom dead center of the ram;
   (c) choosing the smaller of the selected drawing depth and the bottom depth; and
   (d) drawing the workpiece using the chosen depth to thereby deform the workpiece.

2. The method of claim 1, wherein one of said parameters is the type of working wheels in use.

3. The method of claim 1, wherein one of said parameters is the radius of the working wheels.

4. The method of claim 1, wherein one of said parameters is the number of clamps being used to hold the workpiece.

5. The method of claim 1, wherein one of said parameters is workpiece material.

6. The method of claim 1, wherein one of said parameters is workpiece thickness.

7. The method of claim 1, wherein one of said parameters is shape of the drawing course.

8. The method of claim 1, wherein one of said parameters is working speed.

9. The method of claim 1, wherein one of said parameters is working accuracy.

* * * * *